(12) United States Patent
Magnusson et al.

(10) Patent No.: US 11,608,765 B2
(45) Date of Patent: Mar. 21, 2023

(54) METHOD FOR DETERMINING UREA FEEDING IN AN EXHAUST GAS AFTERTREATMENT SYSTEM OF A VEHICLE COMPRISING AN INTERNAL COMBUSTION ENGINE

(71) Applicant: VOLVO TRUCK CORPORATION, Gothenburg (SE)

(72) Inventors: Mathias Magnusson, Gothenburg (SE); Johanna Bergström, Gothenburg (SE); Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/450,517

(22) Filed: Oct. 11, 2021

(65) Prior Publication Data

US 2022/0112825 A1 Apr. 14, 2022

(30) Foreign Application Priority Data

Oct. 13, 2020 (EP) .................................... 20201602

(51) Int. Cl.
| | |
|---|---|
| *F01N 3/021* | (2006.01) |
| *F01N 3/20* | (2006.01) |
| *F02D 41/02* | (2006.01) |

(52) U.S. Cl.
CPC ............. *F01N 3/208* (2013.01); *F01N 3/021* (2013.01); *F01N 3/2066* (2013.01);
(Continued)

(58) Field of Classification Search
CPC .......... F01N 3/021; F01N 3/035; F01N 3/208; F01N 2610/02; F01N 2610/1453;
(Continued)

(56) References Cited

U.S. PATENT DOCUMENTS

2015/0204226 A1* 7/2015 Moore ................. F01N 11/002
60/287
2015/0275730 A1* 10/2015 Gupta ................ B01D 53/9486
60/276
(Continued)

FOREIGN PATENT DOCUMENTS

| EP | 3037634 A1 | 6/2016 |
|---|---|---|
| WO | 2014016616 A1 | 1/2014 |

(Continued)

OTHER PUBLICATIONS

European Search Report dated Jan. 29, 2021 in corresponding European Patent Application No. 20201602.8, 8 pages.

*Primary Examiner* — Phutthiwat Wongwian
*Assistant Examiner* — Diem T Tran
(74) *Attorney, Agent, or Firm* — Venable LLP; Jeffri A. Kaminski

(57) ABSTRACT

The present disclosure relates to a method for determining urea feeding in an exhaust gas aftertreatment system (100, 200), the exhaust gas aftertreatment system (100,200) being connectable to an internal combustion engine (101,201) operating under an engine operating condition, the system (100,200) comprising a first Selective Catalytic Reduction (SCR1) system comprising a first selective reduction catalyst (SCR1c) and a first doser (103,203) configured for feeding urea upstream the SCR1 system, at least one Particulate Filter (PF) downstream the SCR1 system or as a substrate for the SCR1c and a second Selective Catalytic Reduction (SCR2) system downstream the PF, the SCR2 system comprising a second selective reduction catalyst (SCR2c) and a second doser (104,204) configured for feeding urea upstream the SCR2c, the method comprising the steps of estimating the amount of particles in the PF; and determining the amount of urea to be fed by the respective first and second doser (4,5) based on the engine operating (Continued)

condition and such that: a) the amount of particles in the PF is within a predefined particle amount range, and, b) the NOx level of the exhaust gas exiting the SCR2 system is within a predetermined NOx level range. The present disclosure also relates to an exhaust gas aftertreatment system (100,200) and a vehicle comprising the exhaust gas aftertreatment system (100,200), a computer program comprising program code means for performing the steps of the method, a computer readable medium carrying a computer program comprising program code means for performing the steps of the method and a control unit for controlling urea feeding in the exhaust gas aftertreatment system (100,200).

14 Claims, 4 Drawing Sheets

(52) U.S. Cl.
CPC ........ *F02D 41/024* (2013.01); *F01N 2610/02* (2013.01); *F01N 2610/1453* (2013.01); *F01N 2900/08* (2013.01); *F01N 2900/1402* (2013.01); *F01N 2900/1602* (2013.01); *F01N 2900/1606* (2013.01); *F01N 2900/1806* (2013.01)

(58) Field of Classification Search
CPC ..... F01N 2900/1602; F01N 2900/1606; F01N 2900/1402; F01N 2900/1806; F01N 2900/08; F01N 13/009; F01N 13/0093; F01N 2560/026; F01N 2560/06; F01N 2560/14; F01N 2900/0408; F01N 2900/0411; F01N 2900/0412; F01N 2900/1621; F01N 3/2066; F01N 9/00; F02D 41/024; Y02A 50/20; Y02T 10/12; Y02T 10/40
See application file for complete search history.

(56) References Cited

U.S. PATENT DOCUMENTS

| | | | |
|---|---|---|---|
| 2017/0074139 A1* | 3/2017 | Nilsson | F01N 13/009 |
| 2018/0087426 A1* | 3/2018 | Dou | F01N 9/002 |
| 2018/0221819 A1* | 8/2018 | Nilsson | F01N 3/2066 |
| 2018/0230877 A1* | 8/2018 | Nilsson | B01D 53/9477 |

FOREIGN PATENT DOCUMENTS

| | | |
|---|---|---|
| WO | 2020071981 A1 | 4/2020 |
| WO | 2020108991 A1 | 6/2020 |
| WO | 2020181311 A1 | 9/2020 |

* cited by examiner

METHOD FOR DETERMINING UREA FEEDING IN AN EXHAUST GAS AFTERTREATMENT SYSTEM OF A VEHICLE COMPRISING AN INTERNAL COMBUSTION ENGINE

TECHNICAL FIELD

The present disclosure generally relates to a method for determining urea feeding in an exhaust gas aftertreatment system. The invention also relates to an exhaust gas aftertreatment system and a vehicle comprising an internal combustion engine and an exhaust gas aftertreatment system.

BACKGROUND

Exhaust gas aftertreatment systems of modern vehicles most commonly comprise a reduction catalytic system for reducing the levels of nitrogen oxides, also referred to as NOx, that are released into the surrounding air. Such a reduction catalytic system may for instance comprise a so-called Selective Catalytic Reduction (SCR) catalyst.

An SCR catalyst converts NOx with the aid of a catalyst carrier into diatomic nitrogen ($N_2$) and water ($H_2O$). The principle of an SCR catalyst is that a reducing agent, typically urea, is added to a stream of exhaust gas by means of a doser and urea is decomposed into ammonia which is adsorbed onto the catalyst carrier and NOx is reduced to $N_2$ and $H_2O$. However, the decomposition of the urea into ammonia is not always complete, resulting in solid urea deposit formation in the dosing tube or on the SCR catalyst. These solid deposits can impede the flow of the exhaust gases (and uniformity of $NH_3$ supply) and reduce SCR catalyst performance over time.

Furthermore, particulate matter resulting from incomplete combustion of fuel, such as diesel particulate matter resulting from incomplete combustion of diesel, produces soot particles. To reduce emissions of such particles from vehicles and other combustion sources, particulate filters, such as diesel particulate filters, have also been introduced in exhaust gas aftertreatment systems. Particulate filters are designed to remove particles (mainly soot and ash) from the exhaust gas before the exhaust gas is emitted into the environment. The particles are stored in the filter, providing a so-called soot cake in the filter, which enhances the filtration efficiency. However, if the soot particles are built up too much in the filter, this may result in increased fuel consumption and at very high levels of soot in the filter there is a risk for "soot fire" and a cracked filter. The filter may clean itself when the amount of particles in the filter becomes too high, by heating up and burning off the soot particles. However, this implies increased fuel consumption and thus higher NOx values.

When dosing the reducing agent there are thus competing requirements of keeping the amount of particles in the filter at a desired level and an enhanced NOx reduction performance. A minimized solid urea deposit formation may also be a competing requirement. Accordingly, there is a need for an improved and highly controlled method for determining urea feeding in an exhaust gas aftertreatment system and an improved control and efficiency in an aftertreatment system for exhaust systems of vehicles.

SUMMARY

An object of the present disclosure is to provide an improved and highly controlled method for determining urea feeding in an exhaust gas aftertreatment system with an enhanced control of the urea feeding in the system. A further object of the present disclosure is to provide an improved exhaust gas aftertreatment system and a vehicle including the exhaust gas aftertreatment system. Still a further object of the present disclosure is to provide a computer program comprising program code means for performing the steps of the improved method, a computer readable medium carrying a computer program comprising program code means for performing the steps of the improved method and an improved control unit for controlling urea feeding in an exhaust gas aftertreatment system This and other objects may be achieved by a method for determining urea feeding in an exhaust gas aftertreatment system, an exhaust gas aftertreatment system, a vehicle a computer program, a computer readable medium and a control unit.

According to a first aspect, the present disclosure relates to a method for determining urea feeding in an exhaust gas aftertreatment system, the exhaust gas aftertreatment system being connected to an internal combustion engine operating under an engine operating condition, the system comprising a first Selective Catalytic Reduction (SCR1) system comprising a first selective reduction catalyst (SCR1c) and a first doser configured for feeding urea upstream the SCR1c, the exhaust gas aftertreatment system further comprises at least one Particulate Filter (PF), such as a Diesel Particulate Filter (DPF), downstream the SCR1 system, or as a substrate for the SCR1c, and a second Selective Catalytic Reduction (SCR2) system comprising a second selective reduction catalyst (SCR2c) and a second doser configured for feeding urea upstream the SCR2c, the SCR2 system being arranged downstream the PF, the method comprising the steps of;
  estimating the amount of particles in the PF; and
  determining the amount of urea to be fed by the respective first and second doser based on the engine operating condition and the estimated amount of particles in the PF such that: a) the amount of particles in the PF is within a predefined particle amount range, b) the NOx level of the exhaust gas exiting the SCR2 system is within a predetermined NOx level range, and c) the amount of nitrous oxide ($N_2O$) after the SCR2 system is within a predefined acceptable $N_2O$ range.

When the exhaust gas aftertreatment system comprises a PF, being a substrate for the SCR1c catalyst, the PF is considered as being a part of the SCR1 system, unlike when the PF is arranged downstream the SCR1 system, and thus being a separate component. The PF may be a DPF or another type of particulate filter, depending on which fuel the engine is adapted to use.

The present disclosure is at least partly based on the finding that the amount of particles in the particulate filter should be kept within a predefined particle range and that this may be controlled by the exhaust gas aftertreatment system by determining and optimizing the distribution of the urea dosage of the first and/or second urea dosers. Too low levels of particles in the filter may result in particulate emission and too high amounts may lead to increased fuel consumption. At very high particle levels in the filter there may be a risk for so-called "soot fire" with a cracked filter. The method, such as a computer implemented method, according to the first aspect provides an improved control of the exhaust gas aftertreatment system. This is done by determining and optimizing the amount of urea to be fed by the respective first and second doser based on the engine operating conditions and the estimated amount of particles in the PF such that the amount of particles in the PF is within a predefined particle amount range, the NOx level of the exhaust gas exiting the SCR2 system is within a predetermined NOx level range, and the amount of $N_2O$ after the SCR2 system is within a predefined acceptable $N_2O$ range.

The engine operating condition is an operating condition of the engine that affects the exhaust from the engine, e.g., exhaust gas temperature, exhaust gas flow, and exhaust gas composition. The engine operating condition may, e.g., be defined by one or more of an engine speed, an engine load, one or more fuel injection parameters, a fuel type, a fuel mixture, a fuel-to-air mixture, ambient conditions etc.

The exhaust gas aftertreatment system to which this disclosure relates is a double-dose system including a first and a second SCR system. Such exhaust gas aftertreatment system provides a highly efficient NOx reduction. The exhaust gas aftertreatment system may include a control system for performing the steps of the method, such as a computerized control system, including one or more control unit(s), such as one or more electronic control units (ECUs). Such control system may include a respective model for each or some of the components of the exhaust gas aftertreatment system for determining the status of each of the components and for determining an optimized urea dosage to fulfil the set requirements. The determination of the urea dosage by the system may be performed by any well-known determination model(s), such as optimization model(s) or other procedures for obtaining urea dosage values to meet the predefined criteria.

The control system may comprise at least one communication interface for receiving data communicated from other units within the vehicle, such as from various sensors, systems and control units, in particular from an engine control unit. The control system may be configured to communicate wirelessly or via a hardwire system.

The method in line with the present disclosure may include;
  estimating the level of urea conversion to a reductant at the SCR1 system and/or SCR2 system and the amount of urea deposit formation at/in the SCR1 and/or the SCR2 system; and
  determining the amount of urea to be fed by the respective first and second doser such that the amount of urea deposit at the SCR1 and/or the SCR2 system is/are within a respective predefined urea deposit value range.

According to such method wherein the amount of urea fed by the first and second doser respectively is based on both the estimated level of urea deposit and the amount of particles in the PF filter, a reduced and minimized urea deposit is enabled, allowing a more aggressive urea dosage at low temperatures and thus giving a better total NOx reduction performance. It is to be understood that determining the amount of urea to be fed by the respective first and second doser such that: d) the amount of urea deposit at the SCR1 and/or the SCR2 system is/are within a respective predefined urea deposit value range, may form part of the step of determining the amount of urea to be fed by the respective first and second doser based on the engine operating condition and the estimated amount of particles in the PF such that at least the conditions a) b) and c) as mentioned above are fulfilled. In other words, the method may comprise determining the amount of urea to be fed by the respective first and second doser such that at least a), b), c), and d) are fulfilled.

The method according to the present disclosure may comprise the step of estimating the maximum urea conversion possible at the SCR1 system and the urea conversion thus necessary at the SCR2 system and the resulting urea deposit formation at the SCR1 and/or the SCR2 system. This may allow steering the urea to be fed by the first and second urea dosers to minimize the urea deposit, the NOx level of the exhaust gas exiting the SCR2, while keeping the amount of particles in the PF within a desired level range. The method may alternatively or additionally comprise the step of estimating the maximum urea conversion at the SCR1 system and the urea deposit formation at the SCR1 system.

The method in line with the present disclosure may include setting a predefined range of particles exiting the SCR2 system and determining the amount of urea to be fed by the first doser such that the amount of particles after the SCR2 system is within the predefined range. This provides an enhanced control over the amount of particles in the emission from a vehicle.

The method in line with the present disclosure may include setting a predefined range of $NH_3$ exiting the SCR2 system and determining the amount of urea to be fed by the respective first and second doser such that the amount of $NH_3$ after the SCR2 system is within the predefined $NH_3$ range. This provides a system with an enhanced control of $NH_3$ emission.

The method in line with the present disclosure includes determining the amount of urea to be fed by the respective first and second doser such that the amount of $N_2O$ after the SCR2 system is within the predefined $N_2O$ range, thereby providing an improved control of the amount of $N_2O$ in the vehicle emission. A predefined range of $N_2O$ after the SCR2 system, i.e. exiting the SCR2 system, may be set beforehand.

The method in line with the present disclosure may comprise the step of setting the predefined range for the NOx value downstream the SCR1 system above zero and up to a set maximum NOx value for not exceeding the target maximum NOx value at the SRC2 system.

Additionally, in line with the present disclosure, it may also be possible for the method to include a step of determining the amount of urea to be fed by the respective first and second doser to the respective SCR1c and SCR2c such that the amount of particles leaving the system is within a predetermined particle amount range. In other words, the step of determining the amount of urea to be fed by the respective first and second doser may further comprise determining the amount of urea to be fed by the respective first and second doser to the respective SCR1c and SCR2c such that the amount of particles leaving the system is within a predetermined particle amount range. Thus, the method is optimized to steer the dosage of the first and second doser to control that the amount of particles leaving the system is within a predetermined particle amount range.

In line with the present disclosure, the system may advantageously comprise two or more temperature sensors, adapted to measure the temperature of two or more of the following components; the first doser, the SCR1c, the PF, the second doser and/or the SCR2c, providing feedforward and feedback signals to the system wherein the method further comprises the steps of calculating and/or measuring a respective temperature in two or more components, such as for example in the each of the first doser, the SCR1c, the PF, the second doser and the SCR2c, or alternatively in the SCR1c, the PF and the SRC2c. A model of the exhaust gas aftertreatment system may thus calculate temperature in some or in each component of the system for use in the calculations and estimations of the amount of particles in the PF filter and the urea deposit formation at the respective SCR1 and SCR2 system.

The method may comprise the step of estimating the amount of reductant being stored in the respective SCR1c and SCR2c and comparing this to a set value and calculating the amount of NOx which may be reduced in the respective SCR1 and SCR2 system, the estimation being at least partly based on input from the two or more temperature sensors. This may thus provide input to the system whether further urea dosage by the respective urea dosers is necessary to fulfil the NOx requirement and further also optimize the urea dosage to fulfil the competing requirements of the system.

The method may comprise the step of setting a predefined range for the NOx value downstream the SCR1 system to obtain a NOx value downstream the SCR2 system within the predetermined NOx level range while maintaining the amount of particles in the PF within the predetermined particle amount range in the PF. The defined range of NOx downstream the SCR1 system will result in a level of the amount of particles (soot cake) in the PF, which is good enough for particulate filtration without resulting in excess backpressure.

The predefined range for the NOx value downstream the SCR1 system may be based on an estimated maximum NOx conversion in the SCR2 system, on an estimated urea conversion at the SCR2 system and on the estimated amount of particles in the PF.

According to one embodiment of the present disclosure, the method may comprise the step of setting a predefined range for the NOx value downstream the SCR1 system by means of establishing a SCR2 system penalty function based on a predicted offset between NOx downstream the SCR2 system and the predetermined NOx level range downstream the SCR2 system.

By establishing a penalty as a function of NOx value downstream the SCR1 system for several parameters an optimal value of NOx downstream the SCR1 system can be established and a urea flow from the first doser can be assigned. The penalty function is preferably built up so that the penalty is zero for NOx values upstream the SCR2 system resulting in near zero NOx values downstream the SCR2 system. NOx values upstream the SCR2 system resulting in NOx values downstream the SCR2 system above the legislative limits will have very high penalty value.

The method may comprise the step of setting a predefined range for the NOx value downstream the SCR1 system by means of establishing a PF penalty function based on a predicted offset between the amount of particles in the PF and the predefined particle amount range.

The method may comprise the step of setting a predefined range for the NOx value downstream the SCR1 system by means of establishing a urea deposit penalty function based on a predicted offset between the urea deposit at the SCR1 and/or the SCR2 system and the respective predefined urea deposit range.

However, the method may alternatively be performed by means of any other well-known model or models for taking boundary conditions, e.g. the predefined particle amount range, into account when determining the amount of urea to be fed.

In the method, the exhaust gas aftertreatment system may comprise a first ammonia slip catalyst (ASC1), the ASC1 may be included in the SCR1 system and may be arranged in the end of the SCR1 system or may be separate from the SCR1 system and be arranged downstream the SCR1 system or in the beginning of the component arranged downstream the SCR1 system, providing a selective Ammonia ($NH_3$) oxidation function and thereby allow further reduction of NOx emissions.

In the method the exhaust gas aftertreatment system may comprise a second ammonia slip system (ASC2) arranged separately downstream the SCR2 system. The ASC2 may alternatively be included in the SCR2 system and may be arranged in the end of the SCR2 system. This may provide a still enhanced NOx reduction by eliminating traces of ammonia in the system and converting in parallel newly formed and existing NO to $N_2$, resulting in a further reduction of NOx emission.

The method may include setting up a penalty function of $N_2O$ formation in the SCR1 system, such as an SCR1 system including an ASC1, dependent on NOx value downstream SCR1. The method may include setting up a penalty function of $N_2O$ formation in an SCR2 system including an ASC2 dependent on NOx value downstream SCR1.

The desired NOx value will then result in an optimal compromise for amount of particles in the PF (i.e. soot cake thickness), deposit formation/reduction and still fulfilling legal requirements relating to the emission of NOx and $N_2O$.

For example, a penalty function may be set up by calculating the NOx emission level downstream of the SCR2 system as a function of the urea distribution between the SCR1 system and the SCR2 system and assigning a penalty value depending on the NOx emission level. Further, the same type of calculations may be performed for $N_2O$ emissions, particle emissions, soot cake thickness, urea deposits, and penalty values or penalty functions may be assigned for each one of those. All penalty values/functions may be combined into one single penalty function which is optimized to obtain the lowest possible total penalty value.

The method may further comprise the step of;
issuing a signal to the internal combustion engine with an operating condition request in response to detecting a urea deposit value at the SCR1 and/or SCR2 system exceeding the predefined urea deposit value range, the operating condition request resulting in an operating condition with an increased exhaust gas temperature as compared to the exhaust gas temperature associated with a current operating condition of the internal combustion engine.

The method may further comprise the step of;
issuing a signal to the internal combustion engine with an operating condition request in response to detecting a NOx level of the exhaust gas exiting SCR2 exceeding the predetermined NOx level range,
the operating condition request resulting in an operating condition with a reduced level of NOx emission from the internal combustion engine as compared to the level of NOx emission associated with a current operating condition of the internal combustion engine.

The method may further comprise the step of;
feeding the determined amount of urea via the first and/or second doser.

According to a second aspect, the present disclosure relates to an exhaust gas aftertreatment system for an internal combustion engine, the system being connectable to the internal combustion engine operating under an engine operating condition. The system comprises a first Selective Catalytic Reduction (SCR1) system comprising a first selective reduction catalyst (SCR1c) and a first doser configured for feeding urea upstream the SCR1c, at least one Particulate Filter (PF), such as a Diesel Particulate Filter (DPF), downstream the SCR1 system and a second Selective Catalytic Reduction (SCR2) system comprising a second selective reduction catalyst (SCR2c) downstream the PF and a second doser configured for feeding urea upstream the SCR2c, and a control system. The control system is configured to determine a total amount of urea to be fed by the first and second doser based on the engine operating conditions, wherein the control system is adapted to estimate the amount of particles in the PF and wherein the control system is configured to determine the amount of urea to be fed by the respective first and second doser such that: a) the amount of particles in the PF is within a predefined particle amount range, b) the NOx level of the exhaust gas exiting the SCR2 system is within a predetermined NOx level range, and c) the amount of nitrous oxide ($N_2O$) after the SCR2 system is within a predefined acceptable $N_2O$ range.

The exhaust gas aftertreatment system includes a control system for performing the steps of the method, such as a computerized control system, including one or more control unit(s), such as one or more electronic control units (ECUs). Such control system may for example include a respective model for each or some of the components of the exhaust gas aftertreatment system for determining the status of each of the components and for determining a urea dosage to fulfil the set requirements. The determination of the urea dosage by the system may be performed by any well-known determination model(s), such as optimization model(s) or other procedures for obtaining urea dosage values to meet the predefined criteria.

The exhaust gas aftertreatment system may be configured to estimate the urea conversion to a reductant at the SCR1 system and/or the SCR2 system and the system may be further configured to determine the amount of urea to be fed by the respective first and second doser such that the urea conversion to a reductant and the urea deposit value at the SCR1 system and/or the SCR2 system is/are within a predefined urea deposit value range, i.e. a respective predefined urea deposit value set for the respective SCR1 system and the SCR2 system.

The system may be adapted to estimate the urea conversion possible at the SCR1 system and the urea conversion and urea deposit formation at the SCR2 system. This may allow determining an optimized urea dosage to fulfill the competing requirements of minimized urea deposit and a NOx level within the predetermined range.

The system may alternatively or additionally be adapted to estimate the urea conversion possible at the SCR1 system and the urea conversion and urea deposit formation at the SCR1 system.

The exhaust gas aftertreatment system may comprise a first ammonia slip catalyst (ASC1), the ASC1 may be included in the SCR1 system and may be arranged in the end of the SCR1 system or may be separate from the SCR1 system and be arranged downstream the SCR1 system or in the beginning of the component arranged downstream the SCR1 system, providing a selective Ammonia ($NH_3$) oxidation function and thereby allow further reduction of NOx emissions. The exhaust gas aftertreatment system may comprise a NOx sensor downstream the first ASC1 providing input signals to the system, allowing the system to determine if adjustments in the amount of urea to be fed by the first and/or second doser is needed to keep the NOx level of the exhaust gas exiting the SCR2 system within the predefined NOx level range.

The exhaust gas aftertreatment system may comprise a second ammonia slip system (ASC2) arranged separately downstream the SCR2 system. The ASC2 may alternatively be included in the SCR2 system and may be arranged in the end of the SCR2 system. This may provide a still enhanced NOx reduction by eliminating traces of ammonia in the system and converting in parallel newly formed and existing NO to $N_2$, resulting in a further reduction of NOx emission.

The system in line with the present disclosure may be configured to allow a predefined range of particles after the SCR2 system and may be configured to determine the amount of urea to be fed by the first doser such that the amount of particles after the SCR2 system is within the predefined range.

The system in line with the present disclosure may be configured to allow a predefined range of $NH_3$ after the SCR2 system and may be configured to determine the amount of urea to be fed by the respective first and second doser such that the amount of $NH_3$ after the SCR2 system is within the predefined $NH_3$ range.

The exhaust gas aftertreatment system may comprise at least one Diesel Oxygen Catalyst (DOC) to oxidize carbon monoxide, hydrocarbons and diesel particulate matters to $CO_2$ and $H_2O$. The DOC may be arranged upstream the PF and optionally between an ammonia slip catalyst (ASC) and the PF. A temperature sensor may be adapted to measure the temperature of the DOC.

The exhaust gas aftertreatment system may comprise a NOx sensor upstream the SCR1 system providing feedforward and feedback signals to the system and/or a NOx sensor downstream the PF providing feedforward and feedback signals to the system.

The system may include one or more of the following: $NH_3$, NOx, Particle Number, Particle Mass sensors and/or Radio Frequency sensors for stored $NH_3$ and/or stored particulates. The provision of such sensors in the system may provide feedback input to the system, the feedback input may provide input for the system to determining the amount of urea to be fed to the first and/or second doser. The feedback input from the one or more sensors may also provide input to the system if the amount of urea to be fed to the first and/or second doser needs to be adjusted for balancing the system such that the $NH_3$, NOx, Particle Number and/or Particle Mass are within their respective predetermined level range.

The system may include a heater, such as an electrical heater and/or a burner, at one or more of the respective system components, such the SCR1c, SCR2c, the first or second doser, the PF and/or the DOC for providing a temperature increase if needed for balancing of the system, such as preventing urea deposit at the SCR1 system and/or SCR2 system and/or reducing the amount of particles in the PF and/or reducing NOx after the SCR1 system or the NOx exiting the SCR2 system.

The exhaust gas aftertreatment system may comprise two or more temperature sensors, adapted to measure the temperature of two or more of the following: the first doser, the SCR1c, the PF, the second doser and/or the SCR2c, providing feedforward and feedback signals to the system for calculating and/or measuring a respective temperature in each of the SCR1 system, the SCR2 system, and the PF. The system may be adapted to estimate the amount of reductant being stored in the respective SCR1c and SCR2c and comparing this to a set value and calculate the amount of NOx which may be reduced in the respective SCR1 and SCR2 system, the estimation being at least partly based on feedback from the two or more temperature sensors.

The system may be adapted to set a predefined range for the NOx value, such as above zero and up to a set maximum NOx value after the SCR2 system, downstream the SCR1 system to obtain a NOx value downstream the SCR2 system within the predetermined NOx level range while maintaining the amount of particles in the PF within the predefined particle amount range in the PF. This will provide an enhanced control of the NOx level throughout the system allowing the system to determine the urea to be fed by the first and second urea dosers to balance between the requirements of also maintaining a low urea deposit level and an optimal particle level in the PF.

The exhaust gas aftertreatment system may determine a predefined range for the NOx value downstream the SCR1 system based on an estimated possible NOx conversion in the SCR2 system, from an estimated urea conversion from the second doser and from the estimated amount of particles in the PF.

The exhaust gas aftertreatment system may be adapted to set a predefined range for the NOx value downstream the SCR1 system by means of establishing a SCR2 penalty function based on a predicted offset between NOx downstream the SCR2 system and the predetermined NOx level range downstream the SCR2 system.

The exhaust gas aftertreatment system may be adapted to set a predefined range for the NOx value downstream the SCR1 system by means of establishing a PF penalty function based on a predicted offset between the amount of particles in the PF and the predefined particle amount range.

The exhaust gas aftertreatment system may be adapted to set a predefined range for the NOx value downstream the SCR1 system by means of establishing a urea deposit penalty function based a predicted offset between the urea deposit at the SCR1 and/or the SCR2 system and the predefined respective urea deposit range.

The exhaust gas aftertreatment system may comprise a NOx adsorber for adsorbing NOx during a cold start of a vehicle comprising the exhaust gas aftertreatment system. This may allow a less aggressive urea dosing by the first and second urea dosers and thereby reduce the urea deposit level.

According to a third aspect, the present disclosure relates to a vehicle comprising an internal combustion engine and the exhaust gas system according to the second aspect.

According to a fourth aspect, the present disclosure relates to a computer program comprising program code means for performing the method steps according to the first aspect when the program is run on a computer.

According to a fifth aspect, the present disclosure relates to a computer readable medium carrying a computer program comprising program code means for performing the steps of the method according to the first aspect when said program is run on a computer.

According to a sixth aspect, the present disclosure relates to a control unit for controlling urea feeding in an exhaust gas aftertreatment system, the control unit being configured to perform the steps of the method according to the first aspect.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
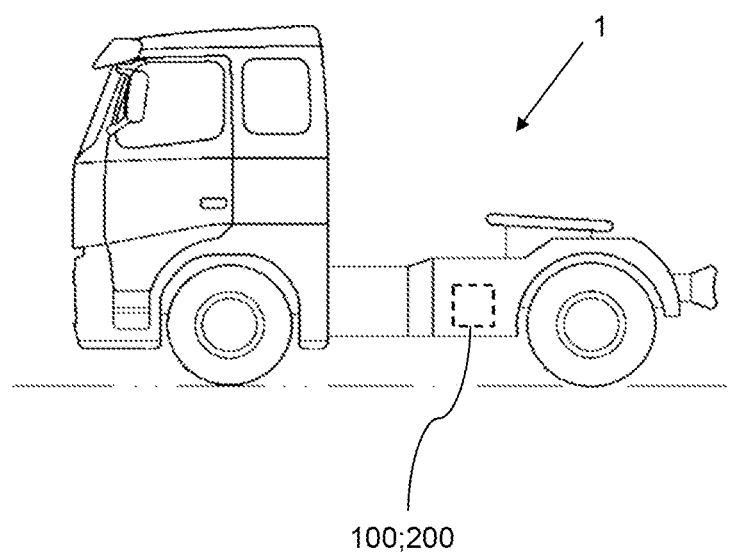
FIG. 1 is a schematic side view of a vehicle.

It is to be understood that the present invention is not limited to the embodiments described below and illustrated in the drawings; rather, the skilled person will recognize that many changes and modifications may be made within the scope of the appended claims.

A vehicle 1 in the form of a truck is schematically shown in FIG. 1. The vehicle 1 includes an internal combustion engine (not shown) for propulsion of the vehicle 1, and an exhaust system 100, 200 for guiding and handling exhaust gases generated by the internal combustion engine.

Figure 2:
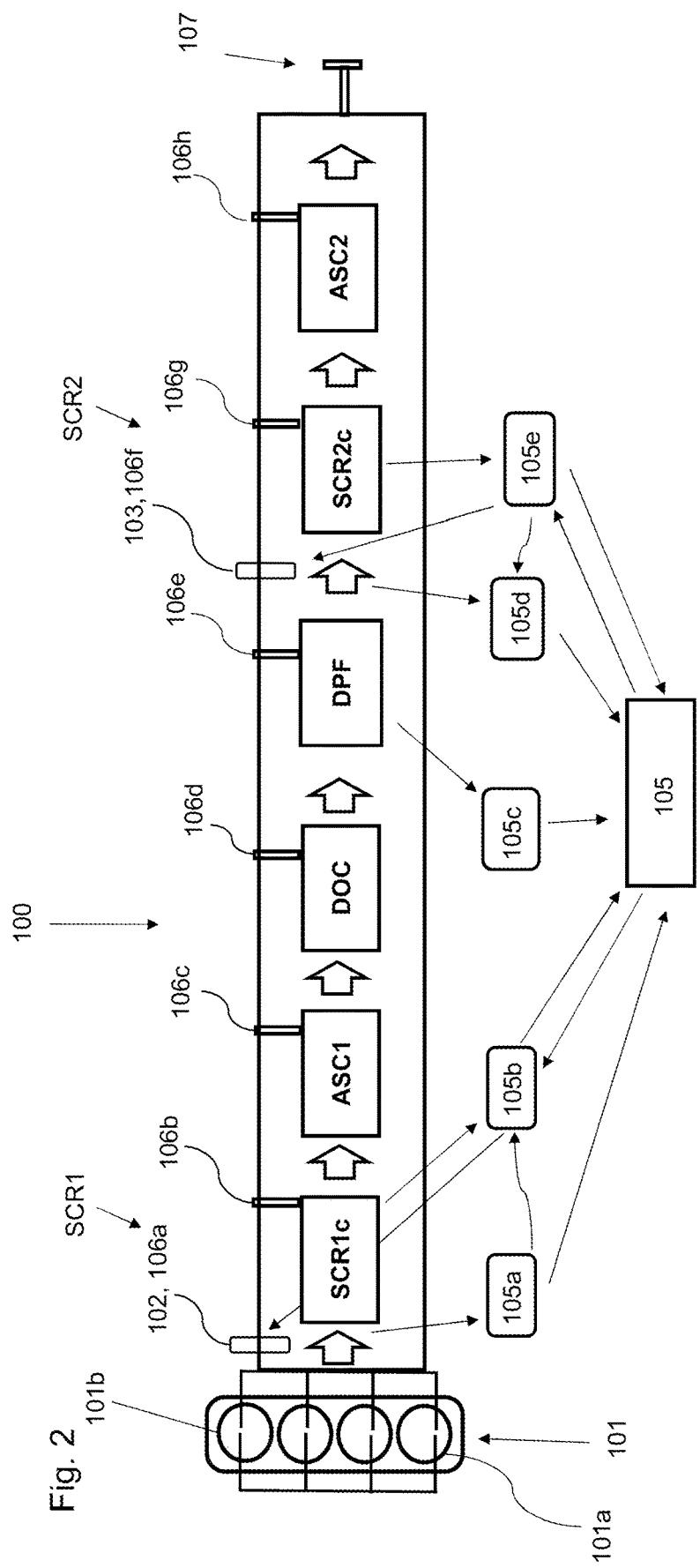
FIG. 2 is a schematic view of an exhaust gas aftertreatment system according to the present disclosure.

FIG. 2 illustrates an exhaust gas aftertreatment system 100 according to one embodiment of the present disclosure where the system 100 is arranged as a component of propulsion means for e.g. a truck 1 as illustrated in FIG. 1. The system 100 is arranged downstream of an internal combustion engine (ICE) 101 comprising a plurality of cylinders 101a,101b. The ICE 101 is arranged in communication with an air intake manifold and exhaust manifold. The further components of the ICE 101 are not illustrated in FIG. 1.

The system illustrated in FIG. 2 is connected to the internal combustion engine 101 operating under an engine operating condition. The system 100 comprises a urea based first Selective Catalytic Reduction (SCR1) system comprising a first selective reduction catalyst SCR1c and a first doser 102 configured for feeding urea upstream the SCR1c. A temperature sensor 106a is adapted to measure the temperature of the first doser 102 and a temperature sensor 106b is adapted to measure the temperature of the SCR1c. Furthermore, a first ammonia slip catalyst ASC1 is arranged downstream the SCR1 system, providing a selective Ammonia ($NH_3$) oxidation function, and a temperature sensor 106c adapted to measure the temperature of the ASC1. A Diesel Oxygen Catalyst DOC is arranged downstream the ASC1 to oxidize carbon monoxide, hydrocarbons and diesel particulate matters to $CO_2$ and $H_2O$, and a temperature sensor 106d is adapted to measure the temperature of the DOC. The system 100 furthermore comprises a Particulate Filter, herein a Diesel Particulate Filter DPF, downstream the DOC for removing diesel particles or soot from the exhaust gas prior to exiting an exhaust pipe 107, and a temperature sensor 106e adapted to measure the temperature of the DPF.

A second Selective Catalytic Reduction SCR2 system comprising a second selective reduction catalyst SCR2c and a second doser 103 configured for feeding urea upstream the SCR2c is arranged downstream the DPF. Each of the second doser 103 and the SCR2c are provided with a respective temperature sensor 106f and 106g adapted to measure the temperature of the two components of the system 100. The DPF separates the two SCR systems SCR1 and SCR2. The urea, such as an aqueous urea, is stored in a storage vessel (not shown) and delivered to a urea delivery system in the form of the first doser 102 and the second doser 103 and to the exhaust manifold upstream the SCR1c and the SCR2c respectively. The urea is metered out by the respective doser, such as in the form of a pump through a control valve, where the respective doser 102,103 is controlled by a control unit. A second ammonia slip catalyst (ASC2) is arranged downstream the SCR2 system, providing a selective Ammonia ($NH_3$) oxidation function, and a temperature sensor 106h is adapted to measure the temperature of the ASC2.

The exhaust gas aftertreatment system 100 includes a control system 105 configured for controlling the exhaust gas aftertreatment system 100. According to one embodiment of the exhaust gas aftertreatment system 100, a respective temperature sensor 106a-106h and a respective model 105a,105b,105c,105e,105e monitors the respective components of the exhaust gas aftertreatment system 100. The control system 105 includes a first urea doser model 105a estimating the urea conversion to the reductants ammonia and isocyanate and additionally the amount of deposit formation and possible urea evaporation at the SCR1 system, a second urea doser model 105d estimates the urea conversion and additionally the amount of deposit formation and possible urea evaporation at the SCR2 system. The control system 105 further comprises an SCR1 model 105b and an SCR2 model 105e, each estimating the amount of ammonia stored in the respective SCR1c and SCR2c and compares the amounts to a respective set value. The SCR1 and SCR2 models 105b,105e each additionally calculates the NOx which may be reduced at the SCR1 and SCR2 systems respectively, it additionally calculates if the NOx is converted to nitrogen gas (N2) or nitrous oxide ($N_2O$). Input to the respective model is a predetermined NOx level, particle amount and $N_2O$ level exiting the SCR2 system and output from the respective SCR1 and SCR2 models is the amount of urea needed to fulfill the required NOx reduction and also for reaching a set value of ammonia stored in the respective catalyst. The SCR1 system may further be connected to a NOx sensor (not illustrated) providing input to the SCR1 model 105b. The control system 105 as illustrated in FIG. 2 also comprises a DPF model 105c estimating the amount of particles in the DPF and the number of particles slipping through the DPF based on the amount of particles in the DPF. The SCR2 system may be connected a NOx sensor (not illustrated) providing input to the SCR2 model 105e.

The control system may be an electronic control system. The control system may comprise at least one communication interface for receiving data communicated from other units within the vehicle, such as from various sensors, systems and control units, in particular from one or more electronic control units (ECUs) controlling systems or subsystems in the vehicle, such as an engine control unit and a transmission control unit. The control device may be configured to communicate wirelessly or via a hardwire system.

Figure 3:
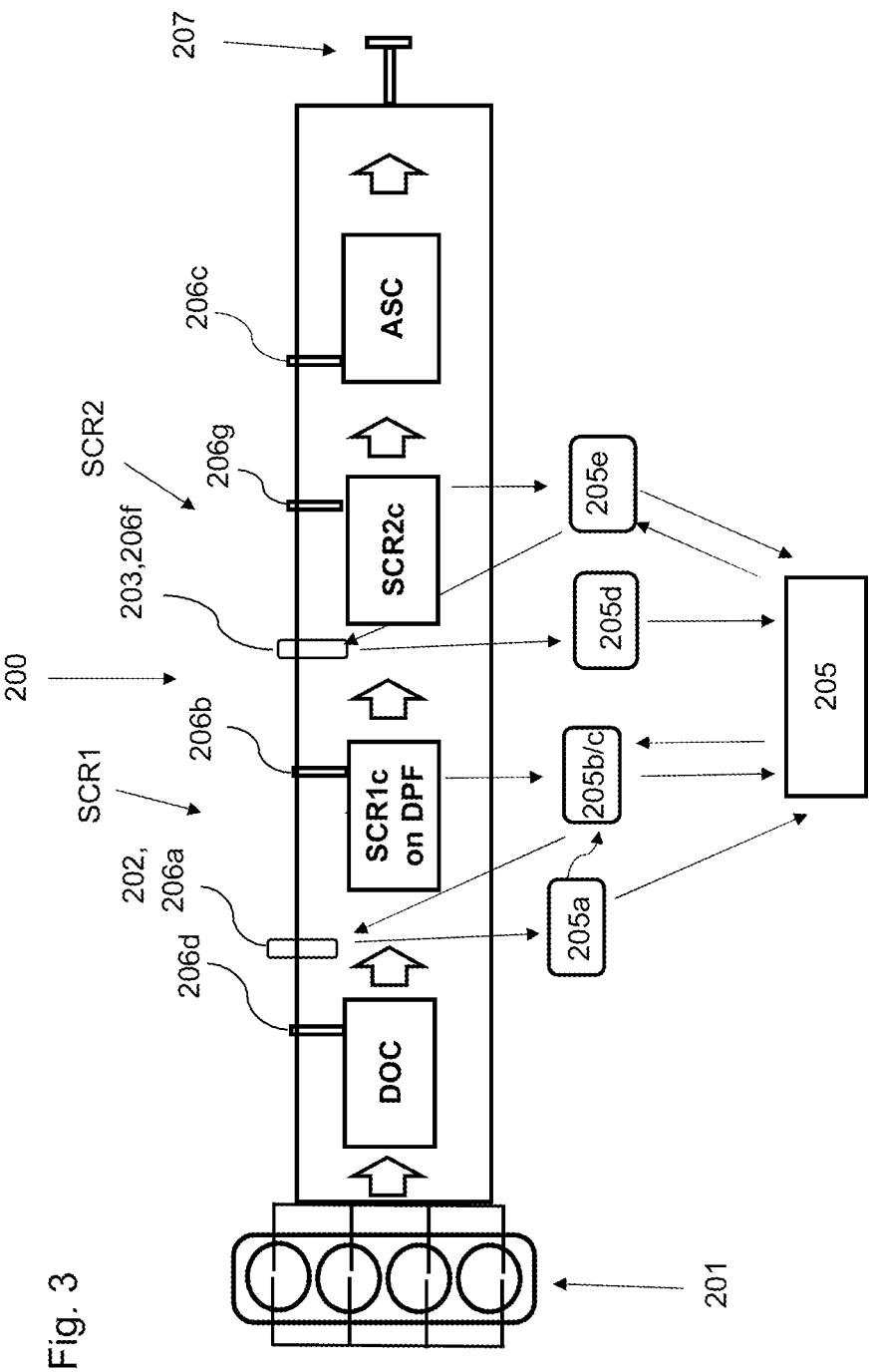
FIG. 3 illustrates an alternative exhaust gas aftertreatment system according to the present disclosure.

FIG. 3 illustrates an alternative exhaust gas aftertreatment system 200 according to the present disclosure. The system 200 illustrated in this figure is connected to an internal combustion engine 201 operating under an engine operating condition. The system 200 comprises a Diesel Oxygen Catalyst DOC and a Selective Catalytic Reduction SCR1 system arranged downstream the DOC. The SCR1 system comprises a first selective reduction catalyst SCR1c, a first doser 202 and a Diesel Particulate Filter DPF being a substrate for the SCR1c. The first doser 202 is configured for feeding urea upstream the SCR1c. A second Selective Catalytic Reduction SCR2 system is arranged downstream the SCR1 system and an ammonia slip catalyst ASC is arranged downstream the SCR2 system. The SCR2 system comprises a second selective reduction catalyst SCR2c and a second doser 203, the second doser 203 being configured for feeding urea upstreams the SCR2c. The alternative exhaust gas aftertreatment system 200 includes a control system 205 configured for controlling the exhaust gas aftertreatment system 200 and monitoring that the NOx level of the exhaust gas before the exhaust gas is emitted into the environment via an exhaust pipe 207 is within a predetermined NOx level range. The control system 205 includes a first urea doser model 205a estimating the urea conversion to the reductants ammonia and isocyanate and additionally the amount of deposit formation and possible urea evaporation at the SCR1 system, a second urea doser model 205d estimates the urea conversion and additionally the amount of deposit formation and possible urea evaporation at the SCR2 system. The control system 205 further comprises an SCR1 model 205b and an SCR2 model 205e, each estimating the amount of ammonia stored in the respective SCR1c and SCR2c and compares the amounts to a respective set value. A DPF model 205c estimates the amount of particles in the DPF and the number of particles slipping through the DPF based on the amount of particles in the DPF.

The exhaust gas aftertreatment system 200 furthermore comprises a respective temperature sensor 206a, 206b,206c, 206d,206f and 206g.

Figure 4:
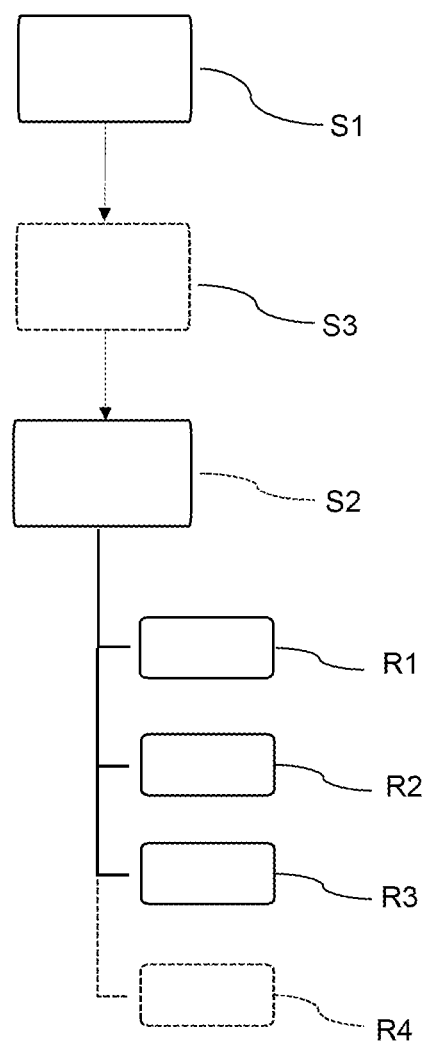
FIG. 4 is a flow chart illustrating the method for determining urea to be fed in an exhaust gas aftertreatment system according to the present disclosure.

FIG. 4 illustrates a method according to the present disclosure for determining urea to be fed in an exhaust gas aftertreatment system, for example in an exhaust gas aftertreatment system 100,200, as illustrated in FIG. 2 or 3. As illustrated in FIG. 4, the method comprises the steps of;

S1) estimating the amount of particles in the DPF;

S2) determining the amount of urea to be fed by the respective first and second doser based on the engine operating condition and such that the following requirements are fulfilled:

R1) that the amount of particles in the DPF is within a predefined particle amount range, R2) that the NOx level of the exhaust gas exiting the SRC2 system is within a predetermined NOx level range, and R3) that the amount of nitrous oxide $N_2O$ after the SCR2 system is within a predefined acceptable $N_2O$ range.

The method according to the present disclosure may optionally include an additional step S3 of estimating the level of urea conversion to a reductant at the SCR1 and/or SCR2 system and the urea deposit at/in the SCR2 system, wherein the step S2 further comprises determining the amount of urea to be fed by the respective first and second doser such that the requirement R4 of the amount of urea deposit at the SCR1 and/or the SCR2 system is/are within a predefined respective urea deposit value range is fulfilled.

The method may be performed by a control system such as or similar to the control system 105,205 included in the exhaust gas aftertreatment system 100,200 as illustrated in FIGS. 2 and/or 3, respectively. The control system 105,205 is configured for controlling the exhaust gas aftertreatment system 100,200 and may include one or more control units, such as electronic control units. The method as illustrated in FIG. 4 may be performed by a control system 105 including the DPF model 105c,205c for estimating the amount of particles in the DPF according to step S1. To perform method step S2b, the control system 105,205 further comprises an SCR 1 model 105b,205b and an SCR2 model 105e,205e, each estimating the amount of ammonia stored in the respective SCR1c and SCR2c and compares the amounts to a respective set value. The SCR1 and SCR2 models 105b,105e,205c,205e each additionally calculates the NOx which may be reduced at the SCR1 and SCR2 systems respectively. The first urea doser model 105a,205a and/or the second urea doser model 105d,205d estimate(s) the level of urea conversion to a reductant at the SCR1 system and/or SCR2 system. Input to the SCR1 and the SCR2 model is the predetermined NOx level, particle amount and $N_2O$ level exiting the SCR2 system and output from the respective SCR1 and SCR2 models is the amount of urea needed to fulfill the required NOx reduction and also for reaching a set value of ammonia stored in the respective catalyst.

The method may optionally include estimating the amount of reductant being stored in the respective SCR1c and SCR2c and comparing this to a set value and calculating the amount of NOx which may be reduced in the respective SCR1 and SCR2 system (method step not shown), the estimation being at least partly based on input from the temperature sensors 106b,206b and 106g,206g shown in FIG. 2 and FIG. 3. The method may furthermore include setting a predefined range for the NOx value downstream the SCR1 system to obtain a NOx value downstream the SCR2 system within the predetermined NOx level range while maintaining the amount of particles in the DPF within the predetermined particle amount range in the DPF, wherein the predefined range for the NOx value downstream the SCR1 system is based on an estimated maximum NOx conversion in the SCR2 system, on an estimated urea conversion at the SCR2 system and on the estimated amount of particles in the DPF.

Each or some of the components, such as one or more of the following components: the first doser 102,202, the second doser 103,203, the SCR1c, the SCR2c and/or the DPF, may have a respective temperature sensor connected thereto to measure the temperature of the component and to provide information to the system 100,200 regarding the temperature in the respective components. If needed the urea dosage by the first and/or second doser need(s) to be adjusted in response to the temperature measured in the respective component to ensure that the required NOx reduction is within the predetermined NOx range and the amount of particles in the DPF is within the predefined particle range.

It is to be understood that the present invention is not limited to the embodiments described above and illustrated in the drawings; rather, the skilled person will recognize that many changes and modifications may be made within the scope of the appended claims. For example, the fuel used may not be limited to diesel fuels but could alternatively be methane, methanol, ammonia, hydrogen, or gasoline.

The invention claimed is:

1. A method for determining urea feeding in an exhaust gas aftertreatment system, the exhaust gas aftertreatment system being connected to an internal combustion engine operating under an engine operating condition, the system comprising a first selective catalytic reduction system comprising a first selective reduction catalyst and a first doser configured for feeding urea upstream the first selective catalytic reduction catalyst, at least one Particulate Filter downstream the first Selective Catalytic Reduction system or as a substrate for the first Selective Catalytic Reduction catalyst and a second Selective Catalytic Reduction system comprising a second selective reduction catalyst and a second doser configured for feeding urea upstream the second selective catalytic reduction catalyst, the second Selective Catalytic Reduction system being arranged downstream the Particulate Filter, the method comprising the steps of:

estimating an amount of particles in the Particulate Filter; and determining an amount of urea to be fed by the respective first and second doser based on the engine operating condition and the estimated amount of particles in the Particulate Filter such that: a) the amount of particles in the Particulate Filter is within a predefined particle amount range, b) a NOx level of the exhaust gas exiting the second Selective Catalytic Reduction system is within a predetermined NOx level range, and c) an amount of nitrous oxide after the second Selective Catalytic Reduction system is within a predefined acceptable nitrous oxide range; and estimating a level of urea conversion to a reductant at the first Selective Catalytic Reduction system and/or the second Selective Catalytic Reduction system and an amount of urea deposit formation at/in the first Selective Catalytic Reduction system and/or the second Selective Catalytic Reduction system, respectively; and determining the amount of urea to be fed by the respective first and second doser such that the amount of urea deposit at the first Selective Catalytic Reduction and/or the second Selective Catalytic Reduction system is/are within a respective predefined urea deposit value range.

2. The method according to claim 1, wherein the method comprises; determining the amount of urea to be fed by the respective first and second doser to the respective first Selective Catalytic Reduction catalyst and second Selective Catalytic Reduction catalyst such that the amount of particles after the second Selective Catalytic Reduction system is within a predetermined particle amount range.

3. The method according to claim 1, wherein the exhaust gas aftertreatment system comprises two or more temperature sensors, adapted to measure the temperature of two or more of the following components; the first doser, the first Selective Catalytic Reduction catalyst, the Particulate Filter, the second doser and/or the second Selective Catalytic Reduction catalyst, providing feedforward and feedback signals to the exhaust gas aftertreatment system wherein the method further comprises the steps of calculating and/or measuring a respective temperature in the two or more components.

4. The method according to claim 3, wherein the method comprises the step of; estimating the amount of reductant being stored in the respective first Selective Catalytic Reduction catalyst and second Selective Catalytic Reduction catalyst and comparing this to a set value; calculating the amount of NOx which may be reduced in the respective first Selective Catalytic Reduction and second Selective Catalytic Reduction system, the estimation being at least partly based on input from the two or more temperature sensors.

5. The method according to claim 1, wherein the method comprises the step of; setting a predefined range for the NOx value downstream the first Selective Catalytic Reduction system to obtain a NOx value downstream the second Selective Catalytic Reduction system within the predetermined NOx level range while maintaining the amount of particles in the Particulate Filter within the predetermined particle amount range in the Particulate Filter.

6. The method according to claim 5, wherein the predefined range for the NOx value downstream the first Selective Catalytic Reduction system is based on an estimated maximum NOx conversion in the second Selective Catalytic Reduction system, on an estimated urea conversion at the second Selective Catalytic Reduction system and on the estimated amount of particles in the Particulate Filter.

7. The method according to claim 1, wherein the method further comprises the step of; issuing a signal to the internal combustion engine with an operating condition request in response to detecting a urea deposit value at the first Selective Catalytic Reduction and/or second Selective Catalytic Reduction system exceeding the predefined urea deposit value range, the operating condition request resulting in an operating condition with an increased exhaust gas temperature as compared to the exhaust gas temperature associated with a current operating condition of the internal combustion engine.

8. The method according to claim 1, wherein the method further comprises the step of; issuing a signal to the internal combustion engine with an operating condition request in response to detecting a NOx level of the exhaust gas exiting the second Selective Catalytic Reduction system exceeding the predetermined NOx level range, the operating condition request resulting in an operating condition with a reduced level of NOx emission from the internal combustion engine as compared to the level of NOx emission associated with a current operating condition of the internal combustion engine.

9. The method according to claim 1, wherein the method further comprises the step of; feeding the determined amount of urea via the first and/or second doser.

10. A computer program comprising program code means for performing the steps of the method according to claim 1 when the program is run on a computer.

11. A computer readable medium carrying a computer program comprising program code for performing the steps of the method according to claim 1 when said program code is run on a computer.

12. A control unit for controlling urea feeding in an exhaust gas aftertreatment system, the control unit being configured to perform the steps of the method according to claim 1.

13. An exhaust gas aftertreatment system for an internal combustion engine, the exhaust gas aftertreatment system being connectable to the internal combustion engine configured to operate under an engine operating condition, the system comprising, a first Selective Catalytic Reduction system comprising a first selective catalytic reduction catalyst and a first doser configured for feeding urea upstream the first selective catalytic reduction catalyst, at least one Particulate Filter downstream the first Selective Catalytic Reduction system, or as a substrate for the first selective reduction catalyst, and a second Selective Catalytic Reduction system downstream the Particulate Filter, the second Selective Catalytic Reduction system comprising a second selective reduction catalyst and a second doser configured for feeding urea upstream the second selective catalytic reduction catalyst, the exhaust gas aftertreatment system further comprising a control system configured to determine a total amount of urea to be fed by the first and second doser based on the engine operating condition, wherein the control system of the exhaust gas aftertreatment system is adapted to: estimate an amount of particles in the Particulate Filter, determine an amount of urea to be fed by the respective first and second doser such that: a) the amount of particles in the Particulate Filter is within a predefined particle amount range, b) a NOx level of the exhaust gas exiting the second Selective Catalytic Reduction system is within a predetermined NOx level range, and c) an amount of nitrous oxide after the second Selective Catalytic Reduction system is within a predefined acceptable nitrous oxide range; and estimate the urea conversion to a reductant at the first selective catalytic reduction and/or the second Selective Catalytic Reduction system and wherein the control system is further configured to determine the amount of urea to be fed by the respective first and second doser such that the urea conversion to a reductant and an urea deposit value at the first Selective Catalytic Reduction and/or the second Selective Catalytic Reduction system is/are within a respective predefined urea deposit value range.

14. A vehicle comprising an internal combustion engine, wherein the vehicle further comprises the exhaust gas aftertreatment system according to claim 13.

* * * * *